3,216,984
PREPARATION OF COPOLYMERS OF VINYL CHLORIDE - VINYL CARBAZOLE USING A BORON TRIALKYLMONOAMINE CATALYST
Georgette Steinbach-Van Gaver, Paris, and Roland Magni, Massy, France, assignors to Compagnie de Saint-Gobain, Neuilly-sur-Seine, France
No Drawing. Filed Sept. 25, 1962, Ser. No. 226,149
Claims priority, application France, Oct. 13, 1961, 875,883
8 Claims. (Cl. 260—87.5)

This invention is related to that which is described in the copending application of Steinbach 126,756 filed June 23, 1960. In that case is disclosed the polymerization of vinyl compounds by means of new catalysts, the borontrialkylmonoammines, an advantage of which is in permitting the use of metallic polymerization apparatus without inhibiting the catalysis.

Copolymers of vinyl chloride and vinyl carbazole have been made by using catalysts such as HCl, peroxides and azoisobutyronitrile, but the yields are low and the products produced are strongly colored, and heterogeneous in constitution as the vinyl carbazole tends to polymerize alone.

It is an object of this invention to improve the product and the process of producing these copolymers, particularly to produce clear co-polymers at better rates of polymerization. Another object is to copolymerize these monomers at relatively low temperature in order to inhibit the formation of those colored compounds that occur at the higher temperatures of the prior art. Another object is to produce specific copolymers of vinyl chloride and vinyl carbazole low in carbazole but of superior properties.

The new copolymers of vinyl chloride and vinyl carbazole containing not substantially more than 25% and not substantially less than 5% vinyl carbazole are homogeneous, clear, and have qualities about the same as polyvinyl chloride except that their softening points are higher, they are stronger, and they have superior electrical properties.

According to this invention, the polymerization can be carried out at relatively low temperature, which has the substantial advantage of eliminating the colored resins which form at the higher temperatures and with the catalysts used in the prior art.

It is another characteristic of the invention that the copolymerization may be carried out with advantage in a plurality of stages of increasing temperature, the polymerization being initially at about room temperature, and the temperature being increased in a later stage by a substantial increment, for instance 10° C.

The third characteristic of the invention is that one may use a plurality of catalysts of the borontrialkylmonoamine class, which have different levels or rates of decomposition, and which may have different physical states, for instance one liquid and one solid. These may be used together or one after another during the stages of the polymerization.

It is an advantage of the new process that it can be carried out in metallic apparatus, for instance in stainless steel autoclaves.

The catalysts are effective in a proportion between about .01% to .4% by weight of the monomers which are subject to copolymerization.

A particularly advantageous group of copolymers, having superior properties, has been discovered and is made by limiting the proportion of vinyl carbazole in the product to about 5 to 25% of the total weight of the copolymers, the balance being vinyl chloride. These new products are homogeneous, which distinguishes them from the non-uniform products of the prior art, only faintly colored because of the elimination of the highly colored polymers characteristic of the prior art, and having physical, electric, and chemical characteristics which are generally like those of polyvinyl chloride except that they have a higher softening point, which is advantageous, they are stronger, and they are superior when applied to identical use in the electric industry.

The following examples illustrate the invention but do not limit the generality of what has been hereinbefore stated. The examples specifically recite borontriethylmonoammine and borontrimethylmonoammine but it is to be understood that the other members of this chemical group of borontrialkylmonoammines may be used either in place of these specific members or for cumulative effect.

*Example 1*

An autoclave of stainless steel provided with a vertical anchor type agitator and with a water jacket for control of temperature received 2 grams of vinyl carbazole crystals and 13 grams of vinyl chloride, of which 40 grams was used immediately to scavenge the air from the apparatus. .058 gram of borontriethylmonoammine was included as the catalyst. Polymerization proceeded for 6 hours at a temperature of 55° C. which was maintained by use of the water jacket. After cooling and reduction of pressure by discharge of gas there was obtained a cream colored powder containing some higher colored particles, which was washed in methanol and dried to 50° C. The composition of the resin was 75% by weight vinyl chloride and 25% vinyl carbazole. The mean hourly rate of transformation was 1.2%. The product was homogeneous.

The same process, replacing the catalyst with monochloracetyl peroxide containing .0132 gram of active oxygen and heated at 55° C. for 90 hours, produced resins containing 77% vinyl chloride and 23% vinyl carbazole at a mean hourly rate of transformation of .1%.

The same test when carried out with 1.5 grams of azoiso-butyronitrile in place of the catalyst produced a heterogeneous brown resin at a mean hourly rate of transformation of 1.2%.

*Example 2*

Into the same apparatus used in Example 1 there were put two grams of vinyl carbazole, 98 grams of vinyl chloride for the reaction and 40 grams for scavenging, and .23 gram of borontriethylmonoammine. After scavenging the apparatus, copolymerization was carried out for 6 hours at 25° C., producing a white resin with a tinge of yellow in a proportion of 91.5 vinyl chloride to 8.5 vinyl carbazole. The mean hourly rate of transformation was 1.9%.

*Example 3*

Example 2 was duplicated except that the heating at 25° C. was carried out for 6 hours and thereafter the temperature was raised to 35° C. for 3½ hours. This produced a white resin tinged with yellow in a proportion of 93.5 to 6.5 (carbazole) at a mean hourly rate of 2.5%.

*Example 4*

Into the apparatus of Example 3 were put two grams of vinyl carbazole and 98 grams of vinyl chloride for the reaction and 40 grams for scavenging, and .073 gram of borontrimethylmonoammine (solid) and .115 gram of borontriethylmonoammine (liquid). After scavenging with the excess vinyl chloride copolymerization was carried out for 3 hours and 35 minutes at 25° C. and then for 3 hours at 35° C., producing a white, yellow-tinged resin with a ratio of chloride to carbazole of 90 to 10. The mean hourly rate of transformation was 3.3%.

*Example 5*

A 3 liter stainless autoclave provided with a vertical agitator recieved 30 grams of vinyl carbazole and 1.095 grams of borontrimethylmonoammine. After closing the apparatus, one introduced through a conduit 1370 grams of vinyl chloride containing 1.725 grams of borontriethylmonoammine. 100 grams of vinyl chloride were used to sweep the air from the chamber. The chamber was kept at 25° C. for 4 hours, the pressure being 2 kg./cm.$^2$. The temperature was raised to 35° C. for 20 hours, the pressure being 3.5 kg./cm.$^2$. After the 6th hour and at the 12th hour there were added .862 gram of borontriethylmonoammine in 200 grams of vinyl chloride of which ½ was immediately discharged from the chamber. After cooling, there were obtained 720 grams of a fine white powder which was washed in methanol. The filtrate showed that there was no extractable monomer left. The vinyl chloride in the composition was to the vinyl carbazole as 94.5 to 5.5. The hourly yield was 2%. The product has a relative viscosity measured at 1% concentration in cyclohexanone of 2.23.

Among the advantages of the invention are these that the product is homogeneous as distinguished from the relative imperfection of the products of the prior art, that the physical and electrical properties show improvement over the copolymerization of the prior art, and over certain properties of vinyl chloride itself, that the process proceeds at a rate which is a multiple of the best rate obtainable by prior art processes which use other catalysts. The color of the product is better, and the highly colored products produced by prior art processes are substantially or wholly eliminated.

As many apparently widely different embodiments of the present invention may be made without departing from the spirit and scope thereof, it is to be understood that the invention is not limited to the specific embodiments.

What is claimed is:

1. A method of copolymerizing vinyl chloride and vinyl carbazole which comprises introducing charges of said monomers into a confined space with a catalytic amount of a lower borontrialkylmonoammine, scavenging the air from the confined space, establishing and maintaining a reaction temperature between room temperature and about 55° C. until the copolymer forms, and recovering the polymer.

2. A method of copolymerizing vinyl chloride and vinyl carbazole which comprises introducing charges of said monomers into a confined space in a proportion producing about 5 to 25% of carbazole in the polymer, with about .01 to about .4% of a lower borontrialkylmonoammine, scavenging the air from the confined space, establishing and maintaining a reaction temperature between room temperature and about 55° C. until the copolymer forms, and recovering the polymer.

3. A method according to claim 1 in which the polymerization is carried out in stages of increasing temperature, the first of which is at lower and a second at a higher temperature, which are not substantially above 55° C.

4. A method according to claim 3 in which the later stage is at about 35° C.

5. A method according to claim 2 in which the catalyst is a mixture of liquid and solid borontrialkylmonoammines.

6. A method according to claim 2 in which the catalyst includes a plurality of lower borontrialkylmonoammines which have different levels of decomposition.

7. A method of preparing a copolymer of vinyl chloride and of vinyl carbazole which comprises copolymerization of vinyl chloride and of vinyl carbazole in contact with at least one boron trialkylmonoammine of the formula:

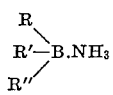

R, R', and R" being lower alkyl radicals at a temperature between room temperature and 55° C.

8. A method of preparing a copolymer of vinyl chloride and of vinyl carbazole which includes copolymerization of vinyl chloride and of 5–25% by weight of vinyl carbazole in contact with 0.1 to about 0.4% by weight of a boron trialkylmonoammine of formula:

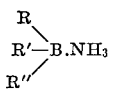

R, R', and R" being lower alkyl radicals at a temperature between room temperature and 55° C.

References Cited by the Examiner

UNITED STATES PATENTS 2,072,465    3/37    Reppe et al. _____ 260—87.5

OTHER REFERENCES

I. G. Farbenindustrie, Pat. No. 666,416, October 1935.
Furukawa et al., Journal of Polymer Science, vol. 26 (1957) (pages 234–236).
Smith et al., Journal American Chemical Society, vol. 73 (pages 2751–4).

JOSEPH L. SCHOFER, *Primary Examiner.*

WILLIAM H. SHORT, *Examiner.*